(12) United States Patent
Miyagi et al.

(10) Patent No.: US 7,092,173 B2
(45) Date of Patent: Aug. 15, 2006

(54) OBJECTIVE LENS DRIVE DEVICE, OPTICAL PICKUP DEVICE, AND DISK DRIVE DEVICE

(75) Inventors: Takahiro Miyagi, Tokyo (JP); Yukihiko Koshimizu, Nagano (JP); Kenji Saka, Nagano (JP); Hiroshi Kitazawa, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/517,015

(22) PCT Filed: Apr. 9, 2004

(86) PCT No.: PCT/JP2004/005174
§ 371 (c)(1), (2), (4) Date: Dec. 7, 2004

(87) PCT Pub. No.: WO2004/090880
PCT Pub. Date: Oct. 21, 2004

(65) Prior Publication Data
US 2005/0231829 A1    Oct. 20, 2005

(30) Foreign Application Priority Data
Apr. 10, 2003   (JP)   ............... 2003-107029

(51) Int. Cl.
G02B 7/02    (2006.01)

(52) U.S. Cl. ........................ 359/813; 359/811

(58) Field of Classification Search ................ 359/813, 359/814, 824, 350, 245, 248
See application file for complete search history.

(56) References Cited

U.S. PATENT DOCUMENTS

| | | | |
|---|---|---|---|
| 5,892,629 A | 4/1999 | Nishihara et al. | ........... 359/814 |
| 2004/0026403 A1* | 2/2004 | Kariya et al. | ........... 219/444.1 |

FOREIGN PATENT DOCUMENTS

| | | | |
|---|---|---|---|
| CN | 1149175 | | 5/1997 |
| CN | 1290003 | | 4/2001 |
| JP | 59064762 A | * | 4/1984 |
| JP | 8-87766 | | 4/1996 |
| JP | 2000-11406 | | 1/2000 |
| JP | 2001-287300 | | 10/2001 |
| JP | 2004-307951 | * | 4/2004 |

* cited by examiner

Primary Examiner—Timothy Thompson
Assistant Examiner—Jerry Fang
(74) Attorney, Agent, or Firm—Oblon, Spivak, McClelland, Maier & Neustadt, P.C.

(57) ABSTRACT

A lens holder portion 3 for holding an objective lens 5 is supported on an end side of each of four suspension wires 2 so that it is capable of moving in a focusing direction and in a tracking direction. Minute uneven faces 2a are formed in the surface of each suspension wire 2. Adhesive agent 11 which fixes each suspension wire 2 on the lens holder 3 and fixing member 4 invades into dented portions in this uneven face 2a and hardens, thereby producing an anchor effect to improve bonding strength. Consequently, in an objective lens drive unit 1 in which the lens holder 3 is supported by a plurality of suspension wires 2, bonding strength to the suspension wire 2 can be improved.

9 Claims, 12 Drawing Sheets

EXTENSION DIRECTION
OF SUSPENSION WIRE

OBJECTIVE LENS DRIVE DEVICE, OPTICAL PICKUP DEVICE, AND DISK DRIVE DEVICE

TECHNCIAL FIELD

The present invention relates to an objective lens drive unit in which a lens-supporting member driven in a tracking direction and a focusing direction is supported on a fixing member with a plurality of linear elastic supporting members, as well as an optical pickup unit and a disk drive unit both provided with this objective lens drive unit. More specifically, it aims at improving bonding strength between the elastic supporting member and the lens-supporting member which are fixed with bonding means and a bonding strength between the elastic supporting member and the fixing member by forming an uneven face in the surface of the elastic supporting member.

BACKGORUND ART

Because the optical pickup unit for reproducing or recording a signal from or on a recording medium (hereinafter referred to as optical disc) such as digital versatile disk (DVD) focuses optical spot on a track on the optical disc, it includes a focus drive mechanism for lifting the objective lens up and down relative to the face of the optical disk. Further to make optical spot follow a track in the optical disk, it is provided with a tracking drive mechanism for moving the objective lens along radial direction of the optical disc (direction of track normal).

Thus, an objective lens drive unit for driving the objective lens two-dimensionally is called bi-axial actuator. As the bi-axial actuator, there is an actuator having a configuration such that a lens holder portion for holding the objective lens is supported on a fixing member with four suspension wires.

In the configuration of supporting the lens holder portion using the suspension wires, the lens holder portion is supported at an end of each suspension wire while the other end of each suspension wire is supported by a fixing member. Consequently, the lens holder portion is supported movably with respect to the fixing member in the focusing direction and tracking direction.

Generally, the fixing of the suspension wire and the lens holder portion and the fixing of the suspension wire and the fixing member are carried out with adhesive agent.

As described above, in the bi-axial actuator having such a configuration that the lens holder portion is supported with the suspension wires, the suspension wires also function as a power-supplying means for a focus coil and a tracking coil provided on the lens holder portion.

For the reason, the suspension wire is soldered to a terminal connected to the focus coil, a terminal connected to the tracking coil and the like. To improve wettability to solder, the suspension wires are tinned.

However, a general glossy tinned suspension wire is incapable of securing a sufficient bonding strength and therefore, there is such a problem that the suspension wire may loose out due to an impact or the like. Consequently, the installation position of the lens holder portion deviates, thereby possibly disabling reproduction of a signal from the optical disk and recording of a signal on the optical disk.

DISCLOSURE OF THE INVENITON

The present invention solves the problem and has an object to provide an objective lens drive unit in which bonding strength to suspension wires is improved, and an optical pickup unit and disk drive unit each having this objective lens drive unit.

The objective lens drive unit of the present invention comprises: an objective lens; a lens-supporting member for holding the objective lens; a plurality of linear elastic supporting members each for supporting the lens-supporting member on an end side thereof; a fixing member for supporting the other end side of each of the elastic supporting members; and a drive means for driving the lens-supporting member in a tracking direction and a focus direction, wherein each of the elastic supporting members is fixed on the lens-supporting member and the fixing member by bonding means and wherein an uneven face having a surface roughness allowing the bonding means to invade therein and harden is formed on at least the surface of the one end side and the surface of the other end side of each of the elastic supporting members.

In the objective lens drive unit of the present invention, the lens-supporting member for holding the objective lens is supported on an end side of each of the a plurality of elastic supporting members and moved by a drive unit in a focusing direction and in a tracking direction.

Minute uneven faces are formed in the surface on one end side which supports the lens-supporting member of this elastic supporting member and on the other end side supported by the fixing member. Bonding means which fixes the elastic supporting member to the lens-supporting member and fixing member invades into a dented portion in the uneven face and hardens.

Consequently, the bonding means and elastic supporting member are bonded firmly by an anchor effect, thereby increasing the bonding strength between the elastic supporting member and the lens-supporting member and the bonding strength between the elastic supporting member and the fixing member. Therefore, there can be provided an objective lens drive unit whose impact resistance is improved.

Further, in the objective lens drive unit of the present invention, the aforementioned uneven face is formed on the surface of the elastic supporting member during a process of plating process to the elastic supporting member.

In the objective lens drive unit of the present invention, the uneven face having a surface roughness higher than a predetermined level is formed to improve the bonding strength of the elastic supporting member during a plating process upon the elastic supporting member for improving the wettability with solder, rust prevention, and the like.

Thus, in the objective lens drive unit of the present invention, the process for improving the wettability with solder and the rust prevention and the process for uneven face treatment for improving the bonding strength are executed in a single process, thereby simplifying production process to reduce production cost. Due to this process, the uneven face of the elastic supporting member in the objective lens drive unit of the present invention are formed in the plating layer.

The optical pickup unit of the present invention incorporates the objective lens drive unit whose impact resistance is improved. That is, the optical pickup unit of the present invention comprises objective lens drive unit, which includes: an objective lens; a lens-supporting member for holding the objective lens; a plurality of linear elastic supporting members each for supporting the lens-supporting member on an end side thereof; a fixing member for supporting the other end side of each of the elastic supporting members; and a drive means for driving the lens-supporting member in a tracking direction and a focus direction, wherein each of the elastic supporting members is fixed on the lens-supporting member and the fixing member by bonding means, and wherein an uneven face having a surface roughness allowing the bonding means to invade therein and harden is formed on at least the surface of the one end side and the surface of the other end side of each of the elastic supporting members.

The disk drive unit of the present invention contains the optical pickup unit incorporating the objective lens drive unit whose impact resistance is improved. That is, the disk drive unit of the present invention comprises an optical pickup unit, which includes: an objective lens for irradiating beam spot to a recording medium; a lens-supporting member for holding the objective lens; a plurality of linear elastic supporting members each for supporting the lens-supporting member on an end side thereof; a fixing member for supporting the other end side of each of the elastic supporting members; and a drive means for driving the lens-supporting member in a tracking direction and a focus direction, wherein each of the elastic supporting members is fixed on the lens-supporting member and the fixing member by bonding means, and wherein an uneven face having a surface roughness allowing the bonding means to invade therein and harden is formed on at least the surface of the one end side and the surface of the other end side of each of the elastic supporting members.

In the optical pickup unit and the disk drive unit of the present invention, the installation of the lens-supporting member never deviates due to an impact or the like from outside. Thus, a signal can be recorded in a recording medium securely and a signal can be reproduced securely from a recording medium.

BEST MODE FOR CARRYING OUT THE INVENTION

Figure 1:
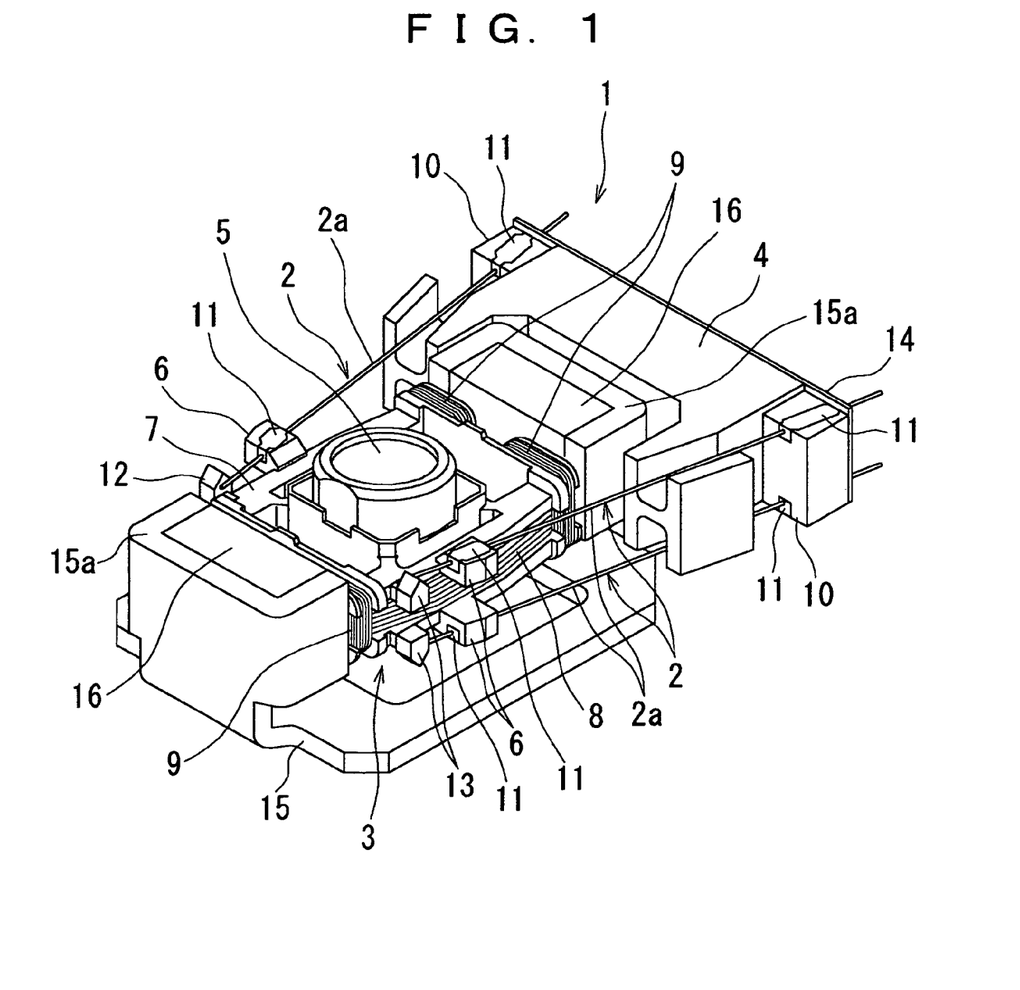
FIG. 1 is a perspective view for showing a configuration of an objective lens drive unit according to this embodiment.

Hereinafter, the embodiments of an objective lens drive unit, an optical pickup unit and a disk drive unit of the present invention will be described with reference to the accompanying drawings. FIG. 1 is a perspective view for showing a configuration of the objective lens drive unit according to this embodiment.

The objective lens drive unit 1 of this embodiment is an bi-axial actuator in which a lens holder portion 3 that is a lens-supporting member is supported on a fixing member 4 with suspension wires 2 as elastic supporting members.

Figure 2:
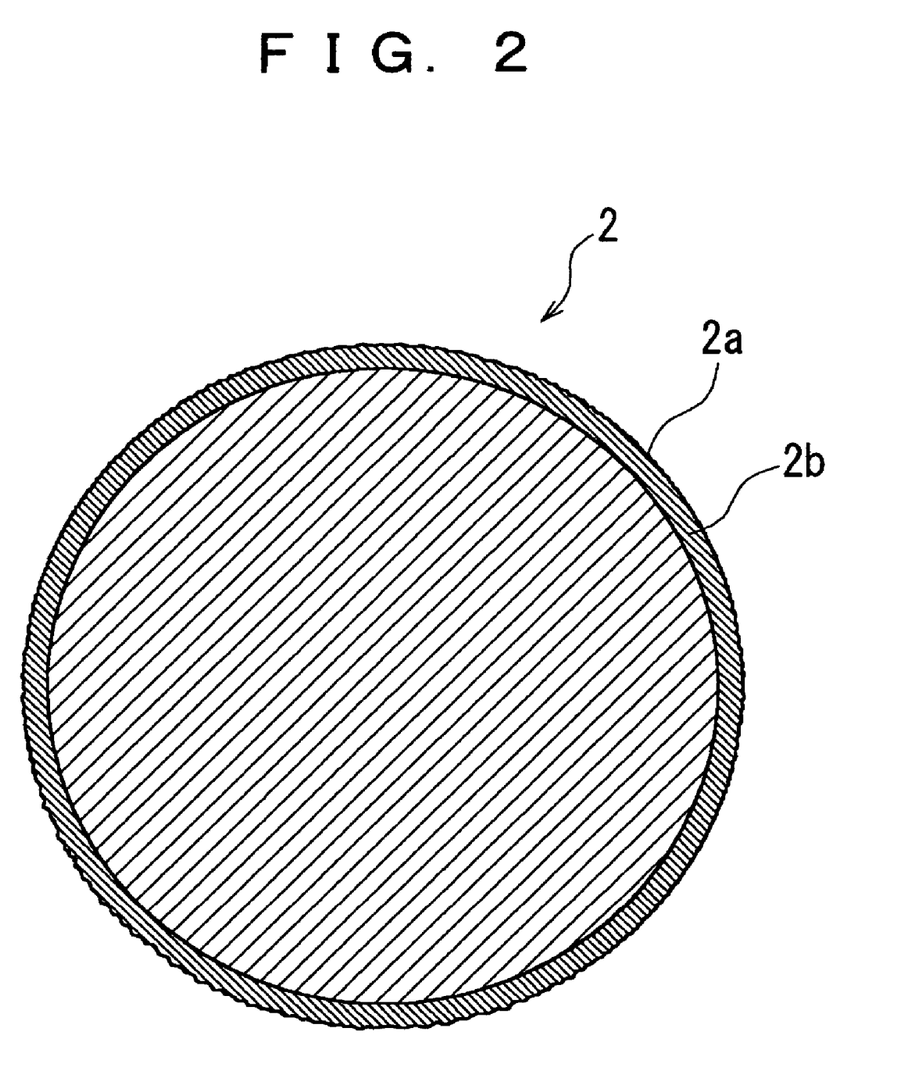
FIG. 2 is a sectional view for showing a configuration of a suspension wire.

FIG. 2 is a sectional view for showing a configuration of the suspension wire. The suspension wire 2 is composed of material having conductivity and elasticity such as beryllium copper wire (Be—Cu). Providing the surface of this suspension wire 2 with a plating layer 2b, for example, in which fine uneven face 2a is formed allows bonding strength between the suspension wire 2, the lens holder portion 3 and the fixing member 4 to be improved.

If speaking of the entire structure of the objective lens drive unit 1 first with reference to FIG. 1, the lens holder portion 3 comprises an objective lens 5, a holder 7 containing a mounting portion for this objective lens 5 and a wire-supporting portion 6 to which the suspension wires 2 are to be attached, a focus coil 8 wound around the outer periphery of the holder 7 horizontally with respect to a surface of an optical disk (not shown), a pair of tracking coils 9 provided in front of and behind the holder 7 along the tangent line of the track of the optical disk.

The lens holder portion 3 is supported on the fixing member 4 with four suspension wires 2. Two wire-supporting portions 6 are provided at two positions on each of opposite sides of the holder 7, totally four positions for those four suspension wires 2. Further, one wire-supporting portion 10 is provided on each of the opposite sides of the fixing member 4, for the four suspension wires 2.

One end side of the suspension wire 2 is fixed to the wire-supporting portion 6 with adhesive agent 11, which is a bonding means, and the other end side is fixed to the wire-supporting portion 10 with the adhesive agent 11.

In FIG. 1, one of the four suspension wires 2, one of the four wire-supporting portions 6 and one of the four wire supporting portions 10 are hidden by the lens holder portion 3 and the like and not represented here.

The suspension wires 2 arranged in the focusing direction are stretched in parallel to each other. Contrary to this, the suspension wires 2 arranged in the tracking direction are stretched with such an angle that an interval on the lens holder 3 side is narrow while the interval on the fixing member 4 side is wide. In the meantime, the suspension wires 2 arranged in the tracking direction may be stretched in parallel to each other.

A terminal 12 for supplying electricity to the focus coil 8 and a terminal 13 for supplying electricity to the tracking coil 9 are provided on the side of the holder 7. Two of the four suspension wires 2 function as an electricity supplying means for applying a control signal to the focus coil 8 and the other two suspension wires function as an electricity supplying means for applying a control signal to the tracking coil 9. Thus, an end portion of the suspension wire 2 fixed on the wire-supporting portion 6 extends up to the terminal 12 or the terminal 13 and the suspension wire 2 is soldered to a corresponding terminal 12 or terminal 13.

A base plate 14 is attached to the rear face of the fixing member 4 that is opposite to the side thereof supporting the lens holder portion 3. A pattern (not shown) on this base plate 14 is connected to the other end of each of the suspension wires 2 by soldering. Consequently, electricity is supplied from the base plate 14 to the focus coil 8 and the tracking coil 9 through the suspension wires 2.

A pair of yokes 15a are provided along the tangent line of a track on an optical disk (not shown) on a yoke base portion 15 and a pair of magnets 16 are mounted on yokes 15a such that the magnet 16 in each of the yokes 15a is oppose each other. The lens holder portion 3 is disposed between the opposing magnets 16 such that each magnet 16 opposes the tracking coils 9. The drive means is constituted of the yoke base portion 15, the magnets 16, the focus coil 8, the tracking coil 9 and the like. The yoke base portion 15 has an opening portion serving as an optical path on which laser beam (not shown) passes.

The objective lens drive unit 1 having the above-described configuration is incorporated in an optical pickup unit (not shown) comprising a light-emitting device such as a semiconductor laser, a light-receiving device such as a photo diode, a beam splitter and the like. Further, the optical pickup unit is incorporated in a disk drive unit comprising a mechanism for rotating an optical disk, a slide feeding mechanism for driving the optical pickup unit and the like.

Next, the focus control and tracking control for the lens holder portion 3 will be described. If a focus control signal generated from a reproduced signal is applied to the focus coil 8, with force of magnetic field formed by a current flowing through this coil, the yoke 15a, and a pair of the magnet 16a, force for lifting up or down the lens holder portion 3 is generated depending on the direction of the current. Because the lens holder portion 3 is supported by one end of each of the four suspension wires 2, if the lens holder portion 3 receives a force in the ascending direction, it lifts up or down while maintaining a posture parallel to an optical disk (not shown). Consequently, the objective lens 5 undergoes focus control in a direction along the optical axis so that beam spot from the objective lens 5 focus on a track of the optical disk.

If a tracking control signal generated from a reproduced signal is applied to the tracking coil 9, with a force of magnetic field formed by a current flowing through this coil, the yoke 15a and a pair of the magnets 16, a force for horizontally moving the lens holder portion 3 in the direction of the inner periphery of an optical disk (obliquely to the left upward in FIG. 1) that is not shown or in the direction of the outer periphery of the optical disk (obliquely to the right downward in FIG. 1) is generated. If the lens holder portion 3 receives a force in the direction of moving horizontally, it slides substantially in parallel to the normal of a track of an optical disk. Consequently, the objective lens 5 undergoes tracking control in the radial direction of the optical disk, so that beam spot from the objective lens 5 can trace a desired track.

Figure 3A:
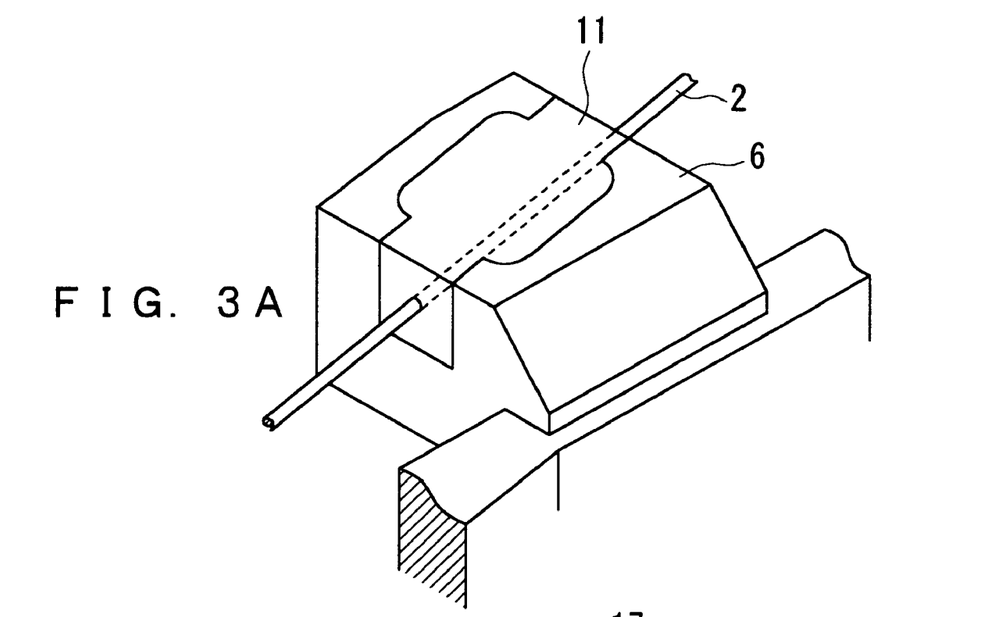
FIG. 3A is an enlarged perspective view for showing a configuration of a wire-supporting portion.
Figure 3B:
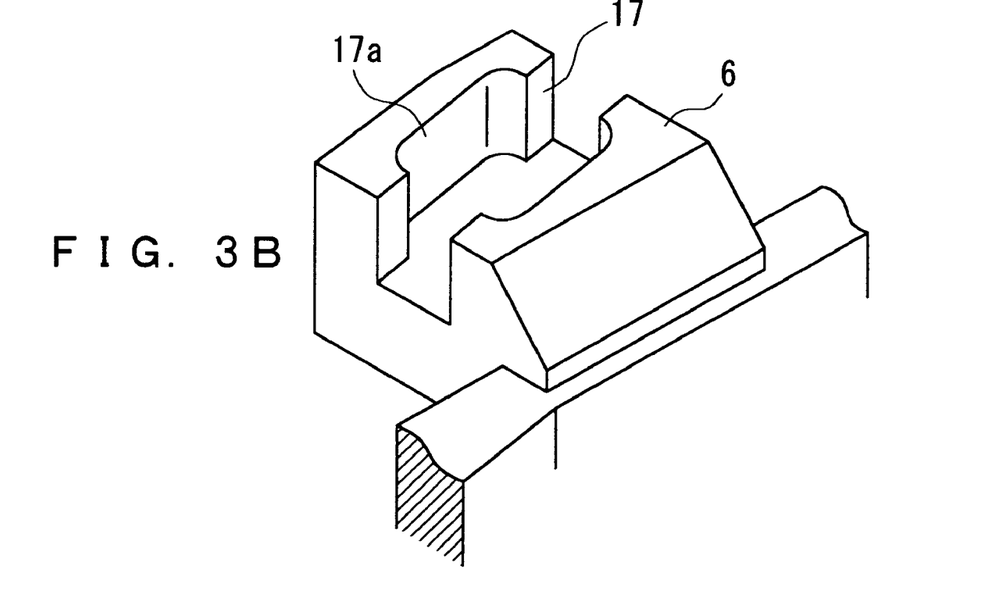
FIG. 3B is an enlarged perspective view for showing a configuration of a wire-supporting portion.

Next, the detail of the wire-supporting portion will be described. FIGS. 3A and 3B are enlarged perspective views each for showing a configuration of the wire-supporting portion with FIG. 3A showing a state in which the suspension wire 2 is fixed while FIG. 3B showing a state before fixing the suspension wire 2. Although FIGS. 3A and 3B represent the wire-supporting portion 6 on the side of the lens holder portion 3, the wire supporting portion 10 on the side of the fixing member 4 has the same structure.

The wire-supporting portions 6, 10 have a groove portion 17 which is open along the extension direction of the suspension wire 2. The side wall of this groove portion 17 has a step portion 17a which is a dented portion.

The suspension wire 2 is placed in the groove portion 17 of each of the wire supporting portions 6, 10 and by filling this groove portion 17 with adhesive agent 11 as shown in FIG. 3A, the suspension wire 2 is fixed. As the adhesive agent 11, for example, UV (ultraviolet curing type) epoxy adhesive agent is employed.

Next, the detail of the suspension wire 2 will be described. The suspension wire 2 is produced by forming minute uneven face 2a on the surface of beryllium copper wire having a diameter of about 0.06–0.1 mm. This uneven face 2a has a surface roughness capable of securing so-called anchor effect.

Figure 4:
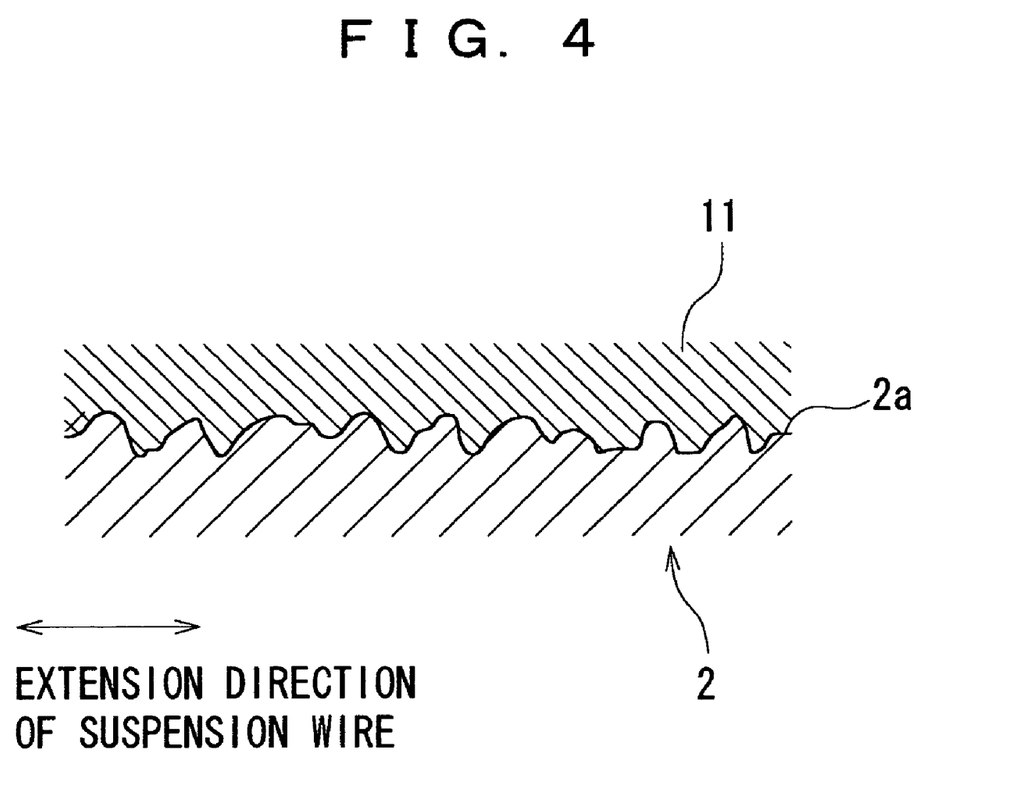
FIG. 4 is an explanatory diagram for showing concept of anchor effect.

FIG. 4 is an explanatory diagram showing concept of the anchor effect. FIG. 4 is an enlarged sectional view for showing schematically a bonding portion between the suspension wire 2 and the adhesive agent 11. When the suspension wire 2 is placed in the groove portion 17 constituting the wire-supporting portion 6, 10 as described in FIG. 3A and this groove portion 17 is filled with the adhesive agent 11, if the uneven face 2a having a predetermined roughness is formed on the surface of the suspension wire 2, the adhesive agent 11 invades into the dented portion in the uneven face 2a and hardens as shown in FIG. 4. Consequently, the suspension wire 2 becomes difficult to slips out of the adhesive agent 11. This effect is called an anchor effect. An arrow in FIG. 4 indicates the extension direction of the suspension wire 2 and even if a force along the extension direction of the suspension wire 2 is applied, the suspension wire 2 is kept difficult to slip out due to meshing between the hardened adhesive agent 11 and the uneven face 2a, thereby improving the bonding strength.

Thus, although the uneven face 2a needs to be formed on at least the surfaces at an end and the other end which are portions of the suspension wire 2 making contact with the adhesive agent 11, it may be formed on the entire surface.

Figure 5A:
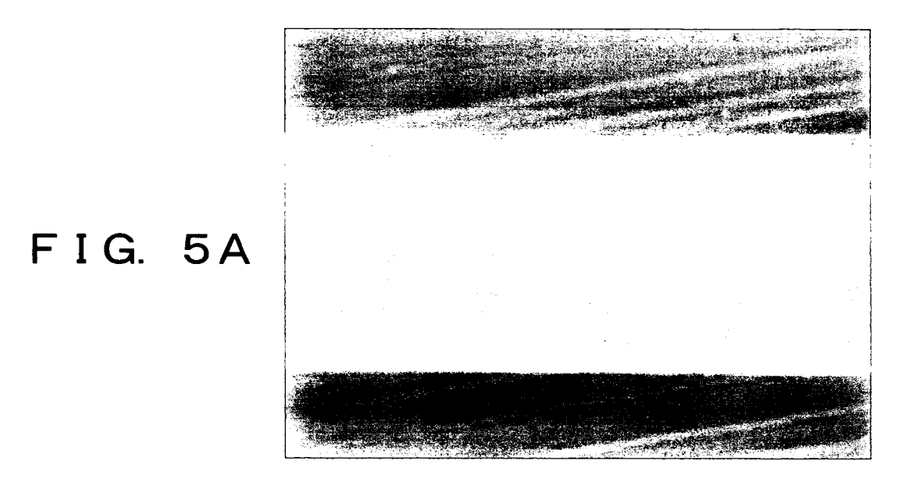
FIG. 5A is a microscopic photograph of the suspension wire which undergoes anchor plating (embodiment 1)
Figure 5B:
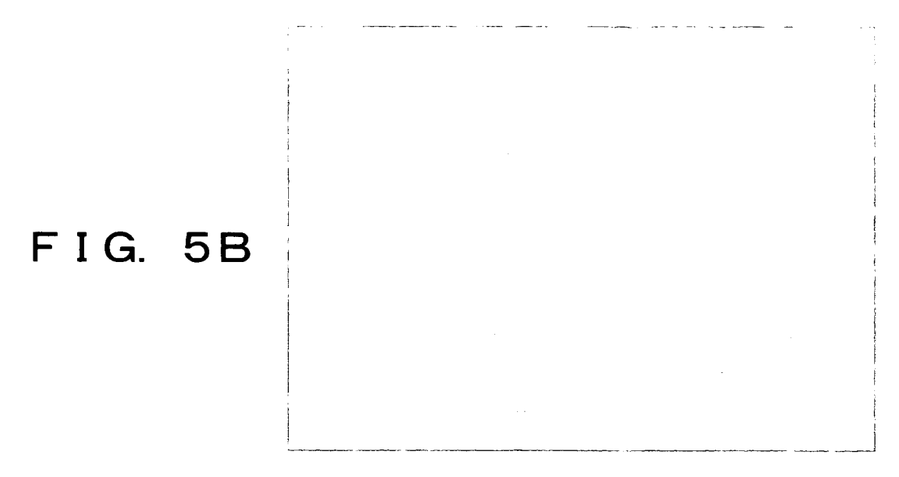
FIG. 5B is a microscopic photograph of the suspension wire which undergoes anchor plating (embodiment 1)
Figure 5C:
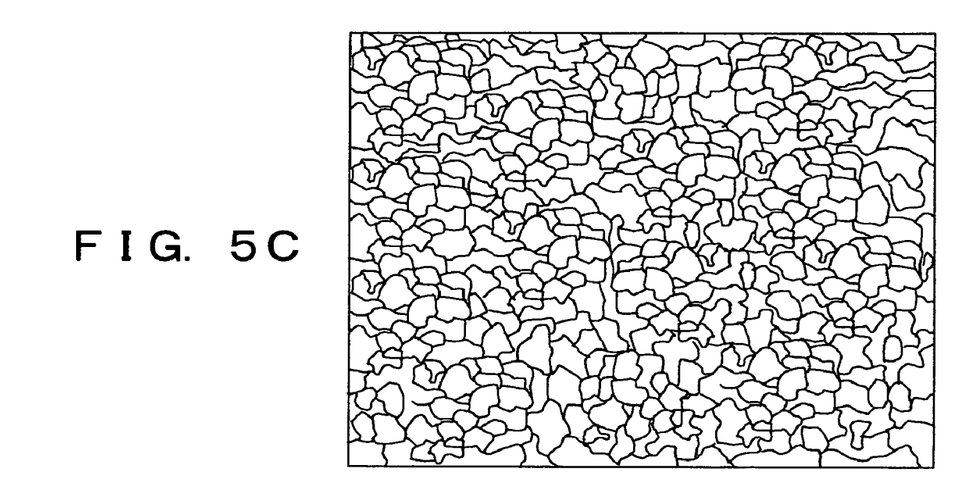
FIG. 5C is a schematic diagram of the surface of the suspension wire which undergoes anchor plating (embodiment 1)

The embodiments of the suspension wire 2 will be described. FIGS. 5A and 5B are microscopic photographs of a suspension wire, which undergoes anchor plating as an embodiment 1. FIGS. 5A and 5B are photographs of the surface of the suspension wire 2 taken with a scanning type electronic microscope (SEM). FIG. 5A is a microscopic photograph taken at 500 magnifications and FIG. 5B is a microscopic photograph taken at 2000 magnifications. FIG. 5C is a schematic view of a microscopic photograph when the magnification is set to 2000 as shown in FIG. 5B.

The suspension wire 2 of the embodiment 1 shown in FIGS. 5A, 5B, 5C is obtained by tinning beryllium copper wire in order to improve wettability with solder and form a plating layer 2b shown in FIG. 2 for rust prevention and the like. In this plating process, the uneven face 2a having surface roughness capable of obtaining the anchor effect is formed on the surface of the plating layer 2b by increasing the concentration of metallic ion in plating solution. The plating through which the uneven face 2a is formed aggressively on the surface is called as an anchor plating. In the meantime, the thickness of the plating layer 2b and the surface roughness of the uneven face 2a are schematically represented.

Table 1 shows a result of an experiment on a pulling force necessary for pulling the suspension wire 2 from the wire-supporting portion 6, 10.

TABLE 1

| Pulling force (N) | Embodiment 1 (anchor plating) | Embodiment 2 (pin holes) | Embodiment 3 (etching) | Embodiment 4 (streaks) | Comparative example (un-glossy plating) | Conventional example (glossy plating) |
|---|---|---|---|---|---|---|
| First time | 10.10 | 9.62 | 9.73 | 8.95 | 7.98 | 2.84 |
| Second time | 10.26 | 9.51 | 9.55 | 9.23 | 8.92 | 3.04 |
| Third time | 10.11 | 9.57 | 8.66 | 8.66 | 8.99 | 2.83 |
| Fourth time | 10.51 | 8.91 | 9.34 | 9.31 | 7.89 | 3.52 |
| Maximum value | 10.51 | 9.62 | 9.73 | 9.31 | 8.99 | 3.52 |
| Minimum value | 10.10 | 8.91 | 8.66 | 8.66 | 7.89 | 2.83 |
| Average | 10.25 | 9.40 | 9.32 | 9.04 | 8.45 | 3.06 |
| Surface roughness Ra (μm) | 0.323 | | | | 0.096 | 0.045 |

The suspension wire 2 of the embodiment 1 on which the plating layer 2b is formed by the anchor plating needed a pulling force of 10 N (Newton) or more at average. According to measurement of the surface roughness (average roughness in the centerline Ra) of the uneven face 2a of the suspension wire 2a of the embodiment 1, Ra=0.323 λm.

Table 1 shows a result of an experiment on the pulling force of the suspension wire tinned with general gloss, as conventional example.

As evident from Table 1, the suspension wire of this conventional example slips out of the wire-supporting portion when it is pulled with a force of around 3 N. As a result of measuring the surface roughness of the suspension wire of the conventional example, plated with gloss, Ra=0.045 μm.

As a comparative example, Table 1 shows a result of an experiment on the pulling force of the suspension wire produced by executing tinning which is generally called un-glossy plating upon beryllium copper wire.

The suspension wire of this comparative example needed a pulling force of around 8 N for pulling out from the wire-supporting portion as shown in Table 1. As a result of measuring the surface roughness of the suspension wire of this comparative example, Ra=0.096 μm.

Consequently, it has been verified that by forming the uneven face 2a having a surface roughness of around 0.1 μm on the surface of the suspension wire 2, the adhesive agent 11 invades into the dented portion of the uneven face 2a and hardens, obtaining the anchor effect, thereby securing a sufficient bonding strength.

Figure 6A:
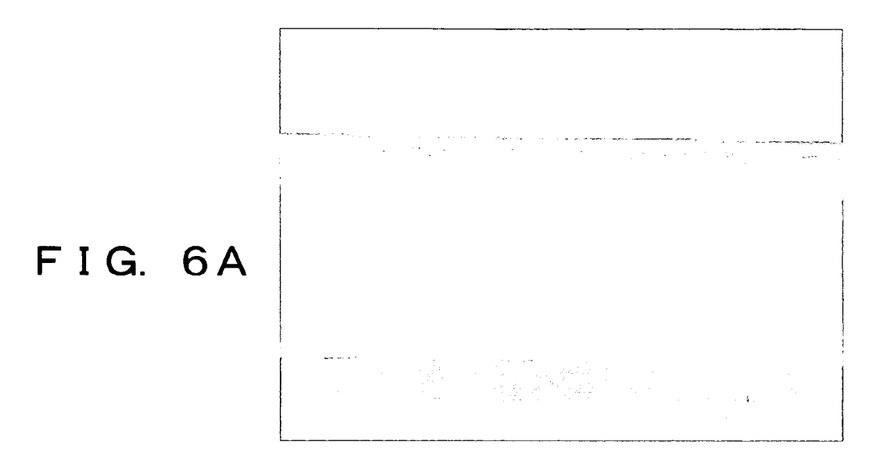
FIG. 6A is a microscopic photograph of the suspension wire in which pin holes are formed (embodiment 2)
Figure 6B:
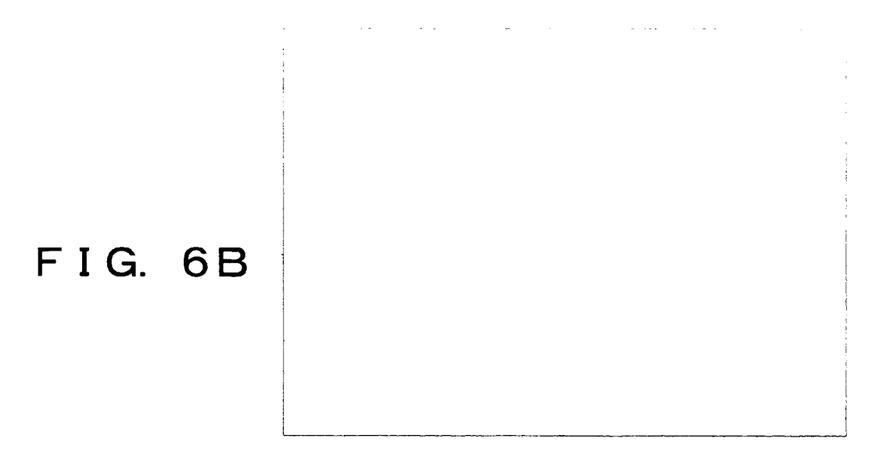
FIG. 6B is a microscopic photograph of the suspension wire in which pin holes are formed (embodiment 2)
Figure 6C:
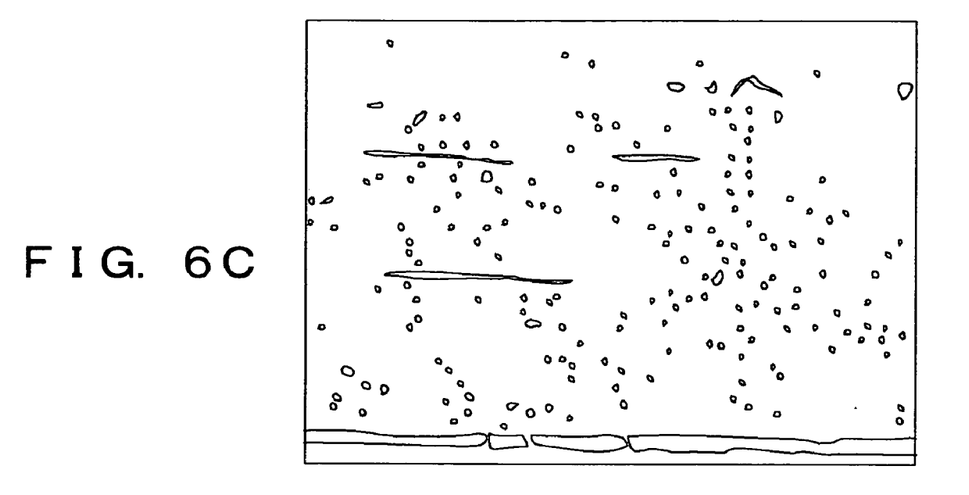
FIG. 6C is a schematic diagram of the surface of the suspension wire in which pin holes are formed (embodiment 2)

Next, other embodiment of the suspension wire 2 will be described. FIGS. 6A and 6B are microscopic photographs of the suspension wire 2 in which pinholes are formed as the embodiment 2. FIG. 6A is a microscopic photograph taken at 500 magnifications and FIG. 6B is a microscopic photograph taken at 2000 magnifications. FIG. 6C is a schematic view of a microscopic photograph when the magnification is set to 2000 as shown in FIG. 6B.

In the suspension wire 2 of this embodiment 2, when a beryllium copper wire was tinned with gloss, the uneven face 2a was formed with a number of minute pin holes.

Figure 7A:
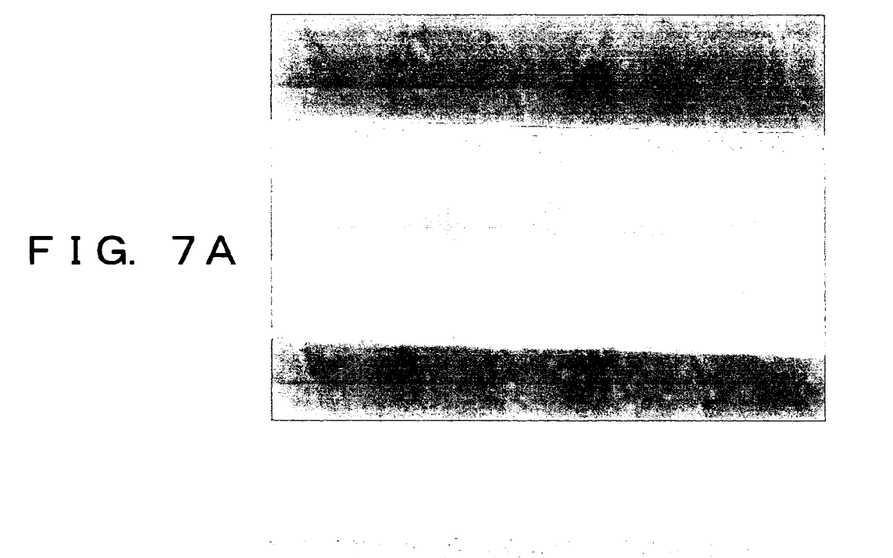
FIG. 7A is a microscopic photograph of the suspension wire etched (embodiment 3)
Figure 7B:
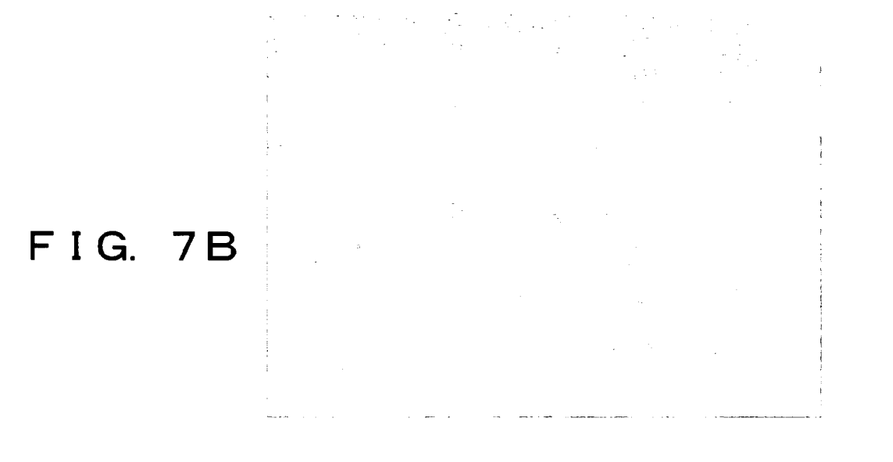
FIG. 7B is a microscopic photograph of the suspension wire etched (embodiment 3)
Figure 7C:
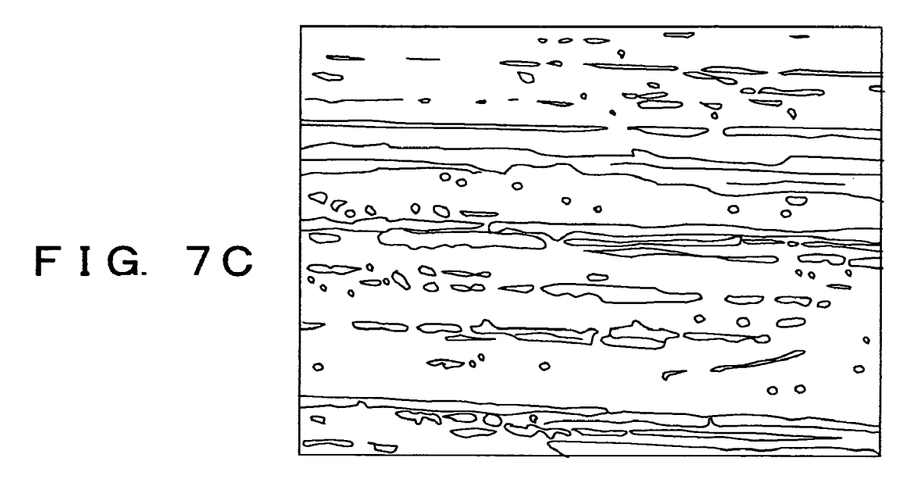
FIG. 7C is a schematic diagram of the surface of the suspension wire etched (embodiment 3)

FIGS. 7A and 7B are microscopic photographs of the suspension wire etched as the embodiment 3. FIG. 7A is a microscopic photograph when the magnification is set to 500 and FIG. 7B is a microscopic photograph when the magnification is set to 2000. FIG. 7C is a schematic diagram of the microscopic photograph when the magnification is set to 2000 as shown in FIG. 7B.

In the suspension wire 2 of this embodiment 3, the surface was roughed by immersing the beryllium copper wire in etching solution and the uneven face 2a was formed during the etching process.

Figure 8A:
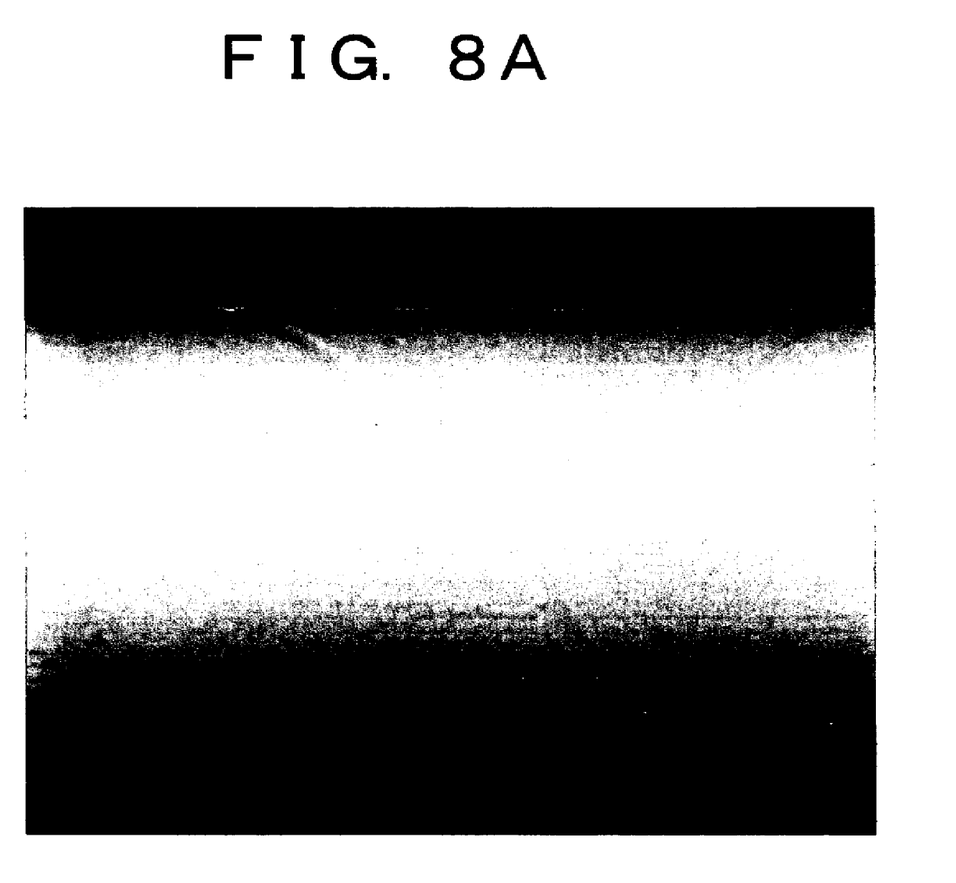
FIG. 8A is a microscopic photography of the suspension wire on which streaks are formed (embodiment 4)
Figure 8B:
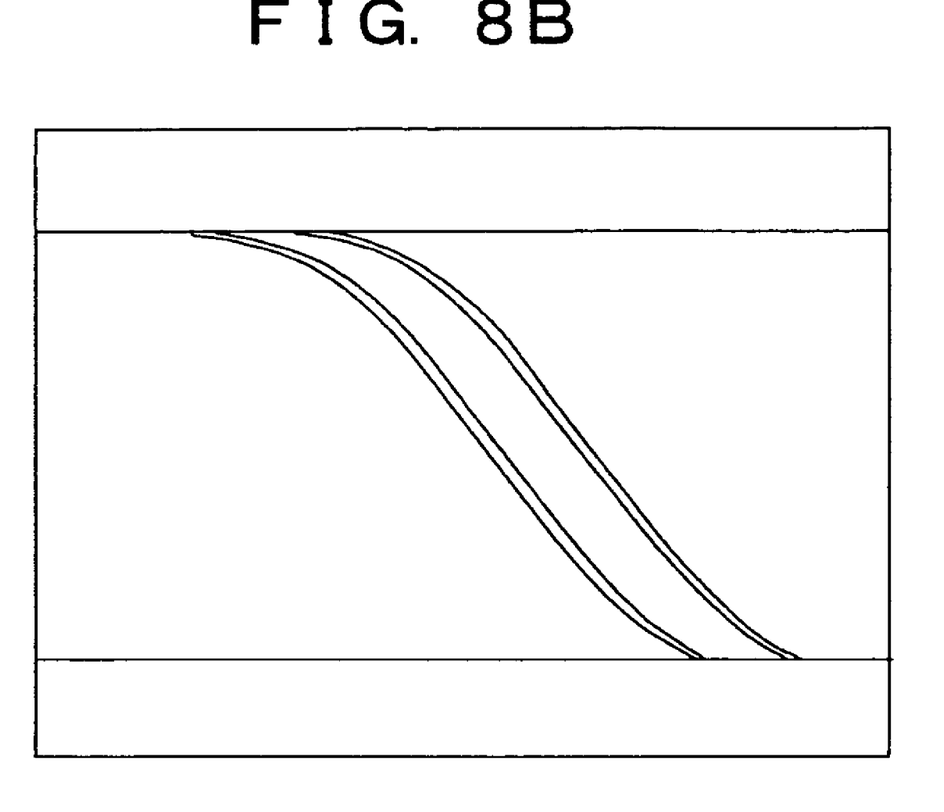
FIG. 8B is a schematic diagram of the surface of the suspension wire on which streaks are formed (embodiment 4).

FIG. 8 is a microscopic photograph of the suspension wire 2 in which streaks are formed. FIG. 8A is a microscopic photograph when the magnification is set to 500. FIG. 8B is a schematic diagram of the microscopic photograph when the magnification is set to 500 as shown in FIG. 8A.

In the suspension wire 2 of this embodiment 4, by forming spiral groove (streak) with an interval of 0.1–2 mm by mechanical processing with a rotation die or rotation blade, the uneven face 2a was formed.

The suspension wires 2 of the embodiments 2–4 needed a pulling force of around 9 N for pulling out from the wire-supporting portion as shown in Table 1.

In the objective lens drive unit 1 for supporting the lens holder 3 with the suspension wire 2 as described above, forming the minute uneven face 2a capable of securing the anchor effect when the adhesive agent 11 invades and hardens in the surface of the suspension wire 2 allows the bonding strength to the suspension wire 2 to be improved.

As a result, there is provided an objective lens drive unit 1 in which the suspension wire 2 is prevented from slipping out of the wire supporting portion 6 on the side of the lens holder portion 3 and the wire supporting portion 10 on the side of the fixing member 4 even if an impact or the like is applied, thereby its impact resistance being improved. Particularly, the suspension wire 2 of the embodiment 1 needs a pulling force of 10 N or more for pulling out of the wire supporting portion and the impact resistance of the objective lens drive unit 1 having the suspension wire 2 of the embodiment 1 is very improved. Further, the suspension wires 2 of the embodiments 2–4 need a pulling force of around 9 N for pulling out of the wire supporting portion and in the objective lens drive unit 1 having the suspension wire 2 of the embodiments 2–4 also, its impact resistance is improved relative to the conventional example.

The suspension wires 2 of the above-described embodiments 2–4 need a pulling force of around 9 N, which is located between the pulling force (around 10 N) necessary for the suspension wire of the embodiment 1 and the pulling force (around 8 N) necessary for the suspension wire of the comparative example.

The surface roughness of the uneven face 2a of the suspension wire 2 of the embodiment 1 was Ra=0.323 μm. Contrary to this, the surface roughness of the suspension wire of the comparative example was Ra=0.096 μm.

Thus, if comparing with the conventional example (Ra=0.045 μm), it is made evident that the surface roughness of the uneven face 2a of the suspension wire 2 needs to be 0.09 μm or more.

In an optical pickup unit or a disk drive unit incorporating such an objective lens drive unit 1, the installation position of the lens holder portion 3 never deviates due to an impact or the like from outside. Thus, a signal can be recorded securely in an optical disk and a signal from the optical disk can be reproduced securely.

In the suspension wire 2 of the embodiment 1, the plating layer 2b is formed to improve the wettability with solder and rust prevention or the like. The wettability with solder is excellent because the plating layer 2b is formed on the surface of the suspension wire 2. Thus, when the suspension wire 2 is soldered to the terminals 12, 13 and the patterns (not shown) on the base plate 14 shown in FIG. 1, work efficiency is excellent, thereby achieving secure soldering. Therefore, such a trouble as electricity supply failure never occurs.

By forming the uneven face 2a during a process of forming the plating layer 2b in the suspension wire 2, a processing for improving the wettability of solder and a process for improving the bonding strength are executed in a first process so as to improve both the bonding strength and wettability with solder without complicating the production process.

Because in the wire-supporting portions 6, 10, the step portion 17a is provided in the side wall of the groove portion 17, the adhesive agent 11 invades into the step portion 17a and hardens to resist a force applied along the extension direction of the suspension wire 2. Consequently, the suspension wire 2 is prevented from slipping out of the wire supporting portion 6, 10 together with the adhesive agent 11.

As other embodiment of bonding means, it is permissible to adopt insert molding in which the suspension wire 2 is placed in the wire supporting portion 6 and molded integrally. In this case also, when resin constituting the holder 7 invades into the dented portion in the uneven face 2a of the suspension wire 2 and hardens, the anchor effect is produced, thereby improving the impact resistance.

As described above, the objective lens drive unit 1 of the present invention comprises the objective lens 5, the lens holder portion 3 for holding the objective lens 5, the linear elastic supporting members such as the suspension wires 2 for supporting the lens holder portion 3 on an end side, and the fixing member 4 for supporting the other end side of the suspension wire 2. The suspension wire 2 is fixed to the lens holder portion 3 and the fixing member 4 with the bonding means such as the adhesive agent 11 and the uneven face 2a having such a surface roughness allowing the adhesive agent 11 to invade therein and harden is formed in the surfaces of at least the one side and the other end side.

Consequently, the adhesive agent 11 and the suspension wire 2 are bonded firmly by the anchor effect so that the bonding strength between the suspension wire 2 and the lens holder portion 3 and the fixing member 4 is improved. Therefore, there is provided the objective lens drive unit 1 whose impact resistance is improved.

By incorporating the objective lens drive unit 1 whose impact resistance is improved as described above, the optical pickup unit and the disk drive unit of the present invention is capable of preventing the lens holder portion 3 from deviating from its installation position due to an impact or the like from outside and recording a signal to a recording medium and reproducing a signal from the recording medium securely.

INDUSTRIAL APPLICABILITY

The present invention can be applied to a unit for supporting a driven object with a linear elastic supporting member.

The invention claimed is:

1. An objective lens drive unit comprising:
an objective lens;
a lens-supporting member for holding said objective lens;
a plurality of linear elastic supporting members each for supporting said lens-supporting member on an end side thereof;
a fixing member for supporting the other end side of each of said elastic supporting members; and
a drive means for driving said lens-supporting member in a tracking direction and a focus direction,
wherein each of said elastic supporting members is fixed on said lens-supporting member and said fixing member by bonding means,
wherein an uneven face having a surface roughness allowing said bonding means to invade therein and harden is formed on at least the surface of said one end side and the surface of the other end side of each of said elastic supporting members, and
wherein said uneven face is composed of plating layer whose surface is rough.

2. The objective lens drive unit according to claim 1 wherein said uneven face is composed of plating layer on which a number of pin holes are formed.

3. An optical pickup unit comprising an objective lens drive unit, said objective lens drive unit including
an objective lens;
a lens-supporting member for holding said objective lens;
a plurality of linear elastic supporting members each for supporting said lens-supporting member on an end side thereof;
a fixing member for supporting the other end side of each of said elastic supporting members; and
a drive means for driving said lens-supporting member in a tracking direction and a focus direction,
wherein each of said elastic supporting members is fixed on said lens-supporting member and said fixing member by bonding means,
wherein an uneven face having a surface roughness allowing said bonding means to invade therein and harden is formed on at least the surface of said one end side and the surface of the other end side of each of said elastic supporting members, and
wherein said uneven face is composed of plating layer whose surface is rough.

4. The optical pickup unit according to claim 3 wherein said uneven face is composed of plating layer on which a number of pin holes are formed.

5. A disk drive unit comprising an optical pickup unit, said optical pickup unit including:
an objective lens for irradiating beam spot to a recording medium;
a lens-supporting member for holding said objective lens;

a plurality of linear elastic supporting members each for supporting said lens-supporting member on an end side thereof;

a fixing member for supporting the other end side of each of said elastic supporting members; and a drive means for driving said lens-supporting member in a tracking direction and a focus direction, wherein each of said elastic supporting members is fixed on said lens-supporting member and said fixing member by bonding means, wherein an uneven face having a surface roughness allowing said bonding means to invade therein and harden is formed on at least the surface of said one end side and the surface of the other end side of each of said elastic supporting members, and wherein said uneven face is composed of plating layer whose surface is rough.

6. The disk drive unit according to claim 5 wherein said uneven face is composed of plating layer on which a number of pin holes are formed.

7. An objective lens drive unit comprising:

an objective lens;

a lens-supporting member for holding said objective lens;

a plurality of linear elastic supporting members each for supporting said lens-supporting member on an end side thereof;

a fixing member for supporting the other end side of each of said elastic supporting members; and a drive means for driving said lens-supporting member in a tracking direction and a focus direction, wherein each of said elastic supporting members is fixed on said lens-supporting member and said fixing member by bonding means, and wherein an uneven face having a surface roughness allowing said bonding means to invade therein and harden is formed on at least the surface of said one end side and the surface of the other end side of each of said elastic supporting members, and wherein said uneven face is composed by roughing the surface of said elastic supporting member by etching.

8. An optical pickup unit comprising an objective lens drive unit, said objective lens drive unit including an objective lens;

a lens-supporting member for holding said objective lens;

a plurality of linear elastic supporting members each for supporting said lens-supporting member on an end side thereof;

a fixing member for supporting the other end side of each of said elastic supporting members; and a drive means for driving said lens-supporting member in a tracking direction and a focus direction, wherein each of said elastic supporting members is fixed on said lens-supporting member and said fixing member by bonding means, wherein an uneven face having a surface roughness allowing said bonding means to invade therein and harden is formed on at least the surface of said one end side and the surface of the other end side of each of said elastic supporting members, and wherein said uneven face is composed by roughing the surface of said elastic supporting member by etching.

9. A disk drive unit comprising an optical pickup unit, said optical pickup unit including:

an objective lens for irradiating beam spot to a recording medium;

a lens-supporting member for holding said objective lens;

a plurality of linear elastic supporting members each for supporting said lens-supporting member on an end side thereof;

a fixing member for supporting the other end side of each of said elastic supporting members; and a drive means for driving said lens-supporting member in a tracking direction and a focus direction, wherein each of said elastic supporting members is fixed on said lens-supporting member and said fixing member by bonding means, wherein an uneven face having a surface roughness allowing said bonding means to invade therein and harden is formed on at least the surface of said one end side and the surface of the other end side of each of said elastic supporting members, and wherein said uneven face is composed by roughing the surface of said elastic supporting member by etching.

* * * * *